United States Patent [19]
Pivar

[11] 3,885,016
[45] May 20, 1975

[54] PROCESS FOR MOLDING HOLLOW THERMOPLASTIC ARTICLES AND RESULTING ARTICLES

[75] Inventor: Stewart Pivar, Muttontown, N.Y.

[73] Assignee: Rototron Corporation, Farmingdale, N.Y.

[22] Filed: Oct. 26, 1973

[21] Appl. No.: 410,045

Related U.S. Application Data

[63] Continuation of Ser. No. 202,975, Nov. 29, 1971, which is a continuation-in-part of Ser. No. 84,503, Oct. 27, 1970, Pat. No. 3,703,348, which is a continuation of Ser. No. 724,802, April 29, 1968, abandoned.

[52] U.S. Cl. ............... 264/269; 264/270; 264/312
[51] Int. Cl. ............................................. B29d 9/08
[58] Field of Search .......... 264/308, 310, 311, 312, 264/269, 270

[56] References Cited
UNITED STATES PATENTS

| | | | |
|---|---|---|---|
| 2,659,107 | 11/1953 | De Bell | 264/310 |
| 2,880,468 | 4/1959 | Mooney | 264/310 X |
| 3,044,124 | 7/1962 | Valentine | 264/311 X |
| 3,275,733 | 9/1966 | Schule | 264/310 |
| 3,417,097 | 12/1968 | Downing | 264/308 |
| 3,455,483 | 7/1969 | Inklaar | 264/310 X |

*Primary Examiner*—Richard R. Kucia
*Attorney, Agent, or Firm*—Roberts & Cohen

[57] ABSTRACT

The process of the invention is provided for molding hollow articles from thermoplastic materials. The process comprises depositing a measured amount of thermoplastic material in a hollow metal mold having a side and bottom walls and rotating this mold about a horizontal axis while simultaneously heating the mold during its rotation until a layer of partially fused material is formed against the side wall thereof. The mold is then pivoted to an attitude which is inclined approximately forty-five degrees to the horizontal and the mold is heated in this attitude for an additional period of time until a layer of partially fused material is formed against the bottom wall. The heating of the mold is continued until at least substantially all the material is fused, whereafter the mold is cooled and the thusly molded article is removed from the mold. The article of the invention is an open container prepared in accordance with the aforegoing method.

14 Claims, 3 Drawing Figures

PROCESS FOR MOLDING HOLLOW THERMOPLASTIC ARTICLES AND RESULTING ARTICLES

OTHER APPLICATIONS

This application is a continuation of application Ser. No. 202,975 filed Nov. 29, 1971 which is a continuation-in-part of my copending application Ser. No. 84,503, filed Oct. 27, 1970 (now U.S. Pat. No. 3,703,348) which in turn is a streamlined continuation application of my earlier filed application, Ser. No. 724,802, now abandoned.

FIELD OF INVENTION

This invention relates to methods for molding hollow thermoplastic articles and to plastic articles manufactured by such methods.

BACKGROUND

Various methods are known for producing hollow articles from liquid and powdered thermoplastic materials. In one known method, a hollow metal mold is completely filled with a powdered thermoplastic material and placed inside an oven to heat. The material adjacent the mold walls is thus fused in place whereafter the mold is removed from the oven, inverted to dump out the excess unfused powder, and placed again into the oven to complete the fusion of the remainder which clings to the mold walls. The mold is then cooled and the thusly molded part is removed.

In the so-called "rotational" molding, techniques are known in which a measured amount of liquid or powdered thermoplastic material is placed inside an enclosed hollow metal mold which is then subjected to simultaneous multi-axial rotation while being heated.

Rotational molding has received widespread use and plays an important role in the plastic molding industry. Two specific methods which are most widely used respectively consist of the simultaneous bi-axial rotation of a hollow metal mold containing a charge of molding material within a heating oven or of a technique in which a bi-axially rotated hollow mold is externally jacketed with a hollow chamber through which a heated liquid is circulated. In both of these cases, use is made of relatively complex and expensive machinery which is needed to support the molds which are quite heavy and to subject them to simultaneous rotation about two axes, which are usually mutually perpendicular. Furthermore, since it is believed that the rotational speeds relative to each of these axes is critical to obtain the best results, these machines are generally provided with means to vary these speeds of rotation and means to exercise close control over the speeds desired. In the rotational molding method, the walls of the molds are uniformly coated with fused thermoplastic material more or less simultaneously.

An object of this invention is to provide an improved process whereby hollow articles are manufactured by the consecutive application of molding material to different parts of the mold interior for the fabrication of molded articles of a generally laminated nature possessing mechanical properties superior to molded articles made by the aforementioned methods.

A further object is to provide an improved process enabling the production of molded vessels with disparate wall thicknesses in different parts thereof.

A still further object is to permit the molding of articles of the above-noted type which are of relatively large size but which can be produced with relatively inexpensive machinery.

Briefly, the above and other objects of the invention are achieved by the provision of a process for molding a hollow article from a thermoplastic material, said process comprising the steps of depositing a measured amount of the thermoplastic material in a hollow metal mold having side and bottom walls, rotating said mold about a horizontal axis while simultaneously heating the mold until a layer of partially fused material is formed against the side wall thereof, pivoting said mold to an attitude which is inclined approximately 45 degrees to the horizontal and heating the mold in said attitude for an additional period of time until a layer of partially fused material is formed against the bottom wall, continuing heating of the mold until at least substantially all of the material is fused, cooling the mold and removing the thusly molded article from the mold.

The process may further comprise returning the mold to horizontal attitude from the inclined attitude to form an additional layer of partially fused material on the previously formed layer. Subsequent layers may be built up in a similar manner. Where additional layers are superposed on previously formed layers, the latter are preferably still in partially fused state when the additional layers are superposed thereupon.

In accordance with the method of the invention, the material charged into the mold may be either powdered or liquid.

In accordance with another aspect of the invention, there is provided the novel article produced according to the aforesaid method.

BRIEF DESCRIPTION OF DRAWING

The invention will be more readily understood by reference to the accompanying drawing in which.

DETAILED DESCRIPTION

Figure 1:
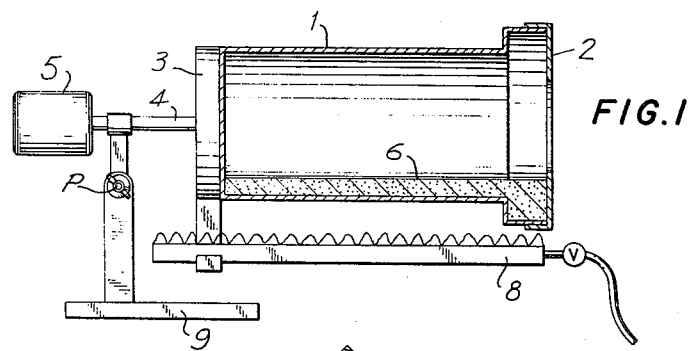
FIG. 1 is a partly cross-sectional and diagrammatic view depicting a mold containing a charge in a horizontal position in accordance with one phase of the method of the invention.
Figure 2:
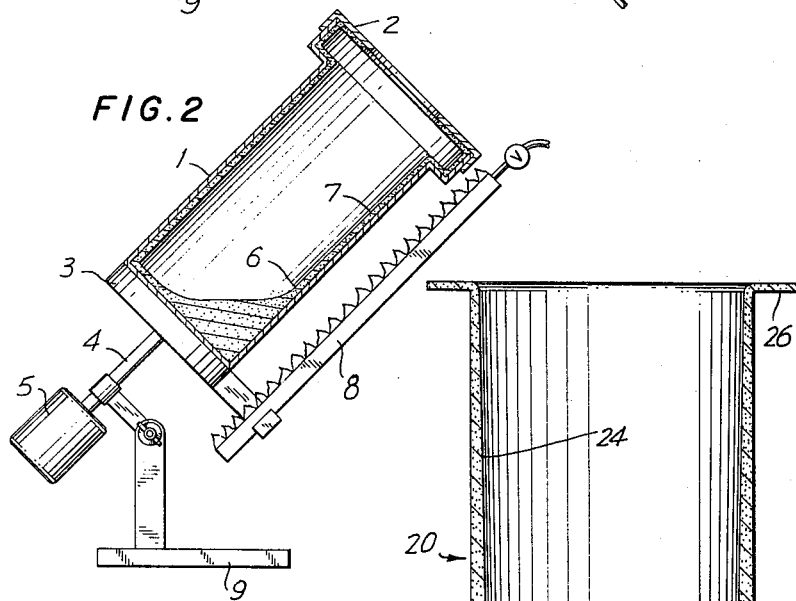
FIG. 2 is a similar view of the mold in a tilted position in accordance with another phase.

As shown in FIG. 1, a mold 1 is used which consists of a hollow metal form having relatively thin walls. The internal shape of the mold conforms to the external shape of the article which is to be molded. A cover 2, fabricated in the same way as mold 1, is removably mounted on the mold upon which the cover may be held, for example, by friction or by conventional mechanical means such as clamps or clips or the like (not shown). A mold mounting bracket 3 of conventional design is used to attach the mold 1 removably to a rotatable shaft 4 which is caused to rotate by an electric motor 5 to which the shaft is connected. A charge 6 of liquid or powdered thermoplastic material is shown disposed inside the mold along with an incompletely fused layer 7 (FIG. 2) of thermoplastic material. An elongated gas burner 8 is disposed longitudinally beneath the mold. The burner can be fixed in position or displaceable with the mold. The shaft is supported through the intermediary of a pivot P by a support means 9 by means of which the mold can be disposed alternately in a horizontal position (FIG. 1) or in a position approximately 45 degrees to the horizontal (FIG. 2).

The making of a molded article using the above apparatus and process of the invention is as follows:

The mold 1 is placed in the horizontal position as shown in FIG. 1 by means of the supporting means 9. A charge 6 of powdered thermoplastic is placed in the mold. The gas burner 8 is ignited and the mold 1 is rotated by motor 5 while being heated from beneath until an incompletely fused layer 7 forms on the interior cylindrical wall of the mold and perhaps partly on the bottom thereof. The mold 1 is then brought to the inclined angle at about 45 degrees as shown in FIG. 2 so as to bring the remaining part of the charge 6 into contact with the lowermost part or bottom of the interior of the mold. Rotation and heating are continued. When all of the charge 6 has fused against the walls, the rotation is stopped and the heating discontinued. The mold is allowed to cool, the cover 2 is removed and the molded part is removed. The cover 2 is thereafter replaced in preparation for the making of another part of the same shape.

In an alternative procedure, the mold 1 can be returned to the horizontal position before all the charge 6 has been fused against the walls so as to form a second layer above the first and incompletely fused layer 7. The mold can be subsequently brought to the tilted position a second time for the same reason.

It can be seen from the above description that, in the process of the invention, the walls of the molded article are formed more or less intermittently or in sequential deposits compared to conventional rotational molding wherein all of the interior of the mold is covered almost simultaneously and uniformly. In practice, it is found that applications of materials to the side of the mold can be conveniently accomplished by placing the mold in the two necessary positions for periods ranging between one and five minutes for each position depending on the characteristics of the material, the wall thickness desired in the finished article, and the size of the mold. A typical material such as low density polyethylene with a melt flow index of 5 will form a layer of 0.100 inch in about 3 minutes. During the formation of such a layer of incompletely fused material that portion of the mold which is not in contact with the charge is nevertheless gaining heat from the heating means. When subsequently the mold is brought into its second position, the heat stored in the mold wall is available to commence fusion of the material newly in contact with it, while the incompletely fused layer previously formed can absorb heat during the following period sufficient to complete the fusion. It is found that layers of incompletely fused material can continue to absorb heat for several minutes without overheating. The conventional procedure wherein fresh material is constantly brought into contact with all portions of the mold is not essential. By varying the amount of time in each of the two positions, a wide variation in wall thickness can be obtained between the different parts of the molded article.

It is found to be preferred in practice that the maximum time to leave the mold in one position is about 6 minutes beyond which the temperature of the part of the mold not in contact with unfused material elevates. If articles of greater wall thickness are desired, it is found to be better to make two or even three applications in each of the two positions of the mold each for a period of between 1 and 6 minutes.

The molded article thereby formed tends to have a somewhat stratified or laminated wall section due to the consecutive applications of material during their formation. When fresh unfused material is brought into contact with a previously formed, partially fused area of the molding, a bond is formed at the interface based on the fact that both layers are somewhat fused and, being constituted of the same material, are capable of interfacial admixture to some degree. However, the layers thereby formed are never-the-less discernible individually due to the fact that the interfacial bond is not complete enough to form a homogeneous mass. Partial oxidation of the exposed surface of the partially fused wall can account for this phenomenon. It is found that, if the heating of the partially fused wall continues to fusion, the next layer applied is bonded so incompletely that the layers can be easily peeled apart after the article is cooled.

This laminated character of the molded article leads to an improvement in certain physical properties over those which are obtained in conventional rotational molding. Among these is an improved ability to resist failure by impact at depressed temperatures. The subject process is found useful in molding large open top vessels such as chemical storage tanks from high or low density polyethylene. Such vessels can be manufactured with side walls of generally tapering cross-section, the thickness being greater in the lower sections of the vessel. This characteristic offers better ability to withstand the higher hydrostatic pressure of the liquids contained therein at the lower parts of the vessel where these pressures are greater. As can be seen in FIGS. 1 and 2, molding material is in contact with a part of the lower side walls of the mold during the time the mold is in both positions shown. In practice, it is found that this results in a wall thickness in the lowest 20% of the side walls which is about 50% greater than the rest of the side walls. A furthr thinning toward the top of such a vessel is the result of the fact that the highest parts of the side walls of the mold are the first to lose contact with molding material when the mold is tilted from the horizontal position and the last part to regain contact with molding material when the mold is returned to that position.

Figure 3:
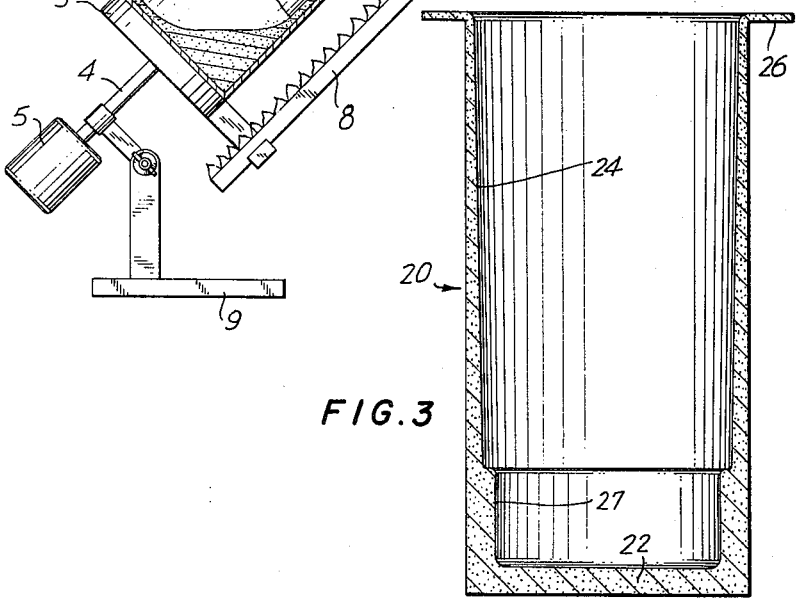
FIG. 3 is a cross-sectional view of an article produced by the method of the invention.

Referring next to FIG. 3, there is seen an article produced in accordance with the invention and indicated generally at 20. This article, which is a molded plastic article, has a bottom 22 and a side wall 24, as well as an upper lip or rim 26. It will be noted that the side wall is tapered and that there is an extra thick portion indicated at 28 resulting from the fact that this portion as well as a corresponding portion of the bottom 22 is exposed to the plastic charge during both attitudes of the mold and the heating thereof.

The features of the finished article noted hereinabove are particularly advantageous. However, it is not precisely possible to define all of the structure of the finished article which is provided in accordance with the invention since this structure involves unobvious features deriving from the process of the invention, but incapable of precise definition. Thus, for example, articles of the invention are characterized by an improved ability to resist failure due to impact at depressed temperatures.

There will now be obvious to those skilled in the art many modifications and variations of the methods set forth hereinabove. Such modifications and variations will not depart from the scope of the invention if defined by the following claims.

What is claimed is:

1. A process for molding a hollow article from a thermoplastic material comprising the steps of depositing a measured amount of said thermoplastic material in a hollow metal mold having side and bottom walls, rotating said mold about a horizontal axis while simultaneously heating said mold and maintaining said axis in horizontal attitude until a layer of partially fused material is formed against the side wall thereof, pivoting said mold to an attitude which is inclined with respect to the horizontal and heating the mold in the latter said attitude for an additional period of time until a layer of partially fused material is formed against the bottom wall and during which additional period of time said layer of partially fused material previously formed against the side wall is permitted to continue to further fuse by the continued application of heat, returning the mold to horizontal attitude for an additional period of time to form an additional layer of partially fused material on the previously formed layer, continuing heating of said mold until at least substantially all of the material is fused, there being dwell periods at the horizontal and inclined attitudes which are of such duration that interfacial bonds are formed which are insufficiently complete to form a homogeneous mass, cooling the mold, and removing the thusly molded article from the mold whereby a laminated article is formed entirely from said measured amount and from the said material.

2. A process as claimed in claim 1, wherein the additional layer is superposed on the previously formed layer while the latter is still in partially fused state.

3. A process as claimed in claim 2, wherein the material is granular.

4. A process as claimed in claim 2, wherein the material is liquid.

5. An article produced according to the method of claim 1.

6. A process as claimed in claim 1 wherein the mold is maintained in each said attitude for about 1 to 6 minutes.

7. A process as claimed in claim 1 wherein the mold is inclined attitude is approximately 45 degrees to the horizontal.

8. A process as claimed in claim 1 wherein during the continuing heating of the mold, the mold is caused to dwell in each of said attitudes at least one additional time.

9. A process as claimed in claim 1 wherein said material, which is the sole material employed, is polyethylene.

10. A process as claimed in claim 1 wherein said measured amount is the sole amount of material used during the process.

11. A process as claimed in claim 1 wherein said layers are formed by bringing fresh unfused material from said measured amount into contact with partially fused material of an underlying layer to provide an interfacial admixture.

12. A process as claimed in claim 11 wherein the partially fused material is partially oxidized.

13. A process as claimed in claim 1 wherein the article is formed with tapering side walls.

14. A process as claimed in claim 1 wherein the mold is given at least one dwell period in each of said attitudes of about 1 to 6 minutes.

* * * * *